United States Patent Office 3,466,282
Patented Sept. 9, 1969

3,466,282
AS-TRIAZINO[5,6-b]INDOLES
Jan Mieczyslaw Zygmunt Gladych, Hertford, and John Harold Hunt, Theydon Bois, England, assignors to Allen and Hanburys Limited, London, England
No Drawing. Original application Aug. 7, 1967, Ser. No. 658,644. Divided and this application July 16, 1968, Ser. No. 745,129
Claims priority, application Great Britain, Sept. 17, 1963, 36,551/63; Feb. 20, 1964, 7,168/64; Aug. 27, 1964, 35,190/64; July 18, 1967, 33,050/67
Int. Cl. C07d 87/38, 55/10; A61k 9/04
U.S. Cl. 260—249.9                    8 Claims

ABSTRACT OF THE DISCLOSURE as-Triazino[5,6-b]indoles of the formula:

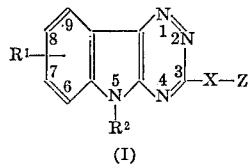

(I)

where $R^1$ is hydrogen, halogen, alkyl of 1–4 carbon atoms, hydroxy, alkoxy of 1–4 carbon atoms, nitro, amino or trifluoromethyl; $R^2$ is hydrogen, lower alkyl of 1–4 carbon atoms, benzyl, or phenylethyl; X is $NR^3$, wherein $R^3$ is hydrogen or methyl; and Z is $AlkNR^4R^5$, where Alk is a branched or straight chain alkylene radical containing 2 to 10 carbon atoms and $R^4$ and $R^5$ are each hydrogen or alkyl of 1–4 carbon atoms, or together with the adjacent nitrogen atom form a heterocyclic ring which may contain additional hetero atoms. The group Alk may also contain one hydroxy group or aryl group in the chain. The preferred heterocyclic rings include morpholino, piperidino, 4-methyl-1-piperazinyl, and pyrrolidino. N-oxide derivatives are a part of the present invention as well as pharmaceutically acceptable non-toxic salts of the as-triazino[5,6-b]indoles of the general formula shown above. They exhibit antiviral activity. Particularly valuable compounds are those substituted in the 3-position with aminoalkylamino moieties.

This application is a divisional-continuation-in-part of Ser. No. 658,644, filed Aug. 7, 1967, which application is a continuation-in-part of Ser. No. 396,727, filed Sept. 15, 1964, now abandoned.

The present invention is concerned with as-triazino [5,6-b]indoles. More particularly, the present invention is concerned with as-triazino[5,6-b]indoles of the general formula:

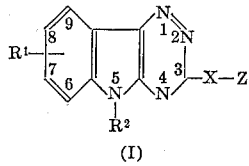

(I)

where $R^1$ is hydrogen, halogen, alkyl of 1–4 carbon atoms, hydroxy, alkoxy of 1–4 carbon atoms, nitro, amino or trifluoromethyl; $R^2$ is hydrogen, lower alkyl of 1–4 carbon atoms, benzyl, or phenethyl; X is $NR^3$, wherein $R^3$ is hydrogen or methyl; and Z is $AlkNR^4R^5$, where Alk is a branched or straight chain alkylene radical containing 2 to 10 carbon atoms and $R^4$ and $R^5$ are each hydrogen or alkyl of 1–4 carbon atoms, or together with the adjacent nitrogen atom form a heterocyclic ring which may contain additional hetero atoms. The group Alk may also contain one hydroxy group or aryl group in the chain.

The preferred heterocyclic rings include morpholino, piperidino, 4-methyl-1-piperazinyl, and pyrrolidino. N-oxide derivatives are a part of the present invention as well as pharmaceutically acceptable non-toxic salts of the as-triazino[5,6-b]indoles of the general formula shown above.

Among the compounds of the invention, there may be mentioned 3-(3-acetamidopropylamino)-5-methyl-as-triazino[5,6-b] indole,
3-(2-diethylaminoethylamino)-5-methyl-as-triazino- [5,6-b]indole,
3(3-diethylaminopropylamino)-5-methyl-as-triazino [5,6-b]indole,
3-(3-dipropylaminopropylamino)-5-methyl-as-triazino [5,6-b]indole,
5-methyl-3-(3-dimethylaminopropylamino)-as-triazino [5,6-b]indole,
3-(3-aminopropylamino)-5-methyl-as-triazino[5,6-b] indole,
5-methyl-3-(3-morpholinopropylamino)-as-triazino [5,6-b]indole, and
5-methyl-3-[3-(4-methyl-1-piperazinyl)propylamino]-as-triazino[5,6-b]indole.

The compounds of Formula I are prepared by the cyclization of isatin β-thiosemicarbazones of the general formula

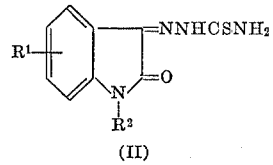

(II)

wherein $R^1$ and $R^2$ have the meanings given above, to give 3-mercapto-as-triazino[5,6-b]indoles of the general formula

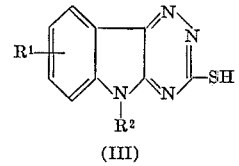

(III)

and then converting the compounds of Formula III to compounds of Formula I by conventional methods.

The thiosemicarbazones of Formula II may be cyclized to give the compounds of Formula III by, for example, refluxing in the presence of ammonia or aqueous potassium carbonate. Alternatively, the thiosemicarbazones need not be isolated in which case thiosemicarbazide and the isatin of formula

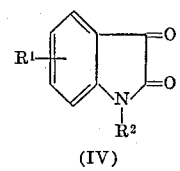

(IV)

are refluxed together in aqueous potasium carbonate solution.

Compounds of Formula I are then prepared by reacting the 3-mercapto-as-triazino[5,6-b]indole of Formula III with an aminating agent, in particular, an aminoalkylamine of the formula $H_2NZ$. The compound of Formula III may be heated under reflux with the aminating agent in an inert solvent such as butanol, or an excess of the reacting amino may be used as the solvent. Alternatively, if the aminating agent is a low boiling amine, an alcoholic solution of it may be heated in a sealed tube with the compounds of Formula III. The latter, in the solid form, are mainly in the 3-thione structure (C=S).

If desired, the basic compounds of Formula I obtained by any of the processes given above may be quaternized or converted into their pharmaceutically acceptable acid addition salts with inorganic or organic acids in the conventional manner.

For the purpose of further illustration of this invention, the following examples are set forth in detail below.

EXAMPLE 1

3-mercapto-5-methyl-as-triazino[5,6-b]indole (a) 6.0 g. of N-methylisatin thiosemicarbazone was suspended in 1.5 l. of water containing 15 ml. of ammonia solution of Sp. Gr. 0.880 and the mixture was boiled under reflux for 24 hours. After cooling, a small amount of insoluble material was removed by filtration and discarded. The filtrate was evaporated under reduced pressure to about one third of its volume and, after cooling, the yellow solid which separated was filtered off and recrystallized from 50% aqueous dimethyl formamide; 3-mercapto-5-methyl-as-triazino[5,6-b]indole was obtained, M.P. 279°–281° C.

The following compounds were prepared in a similar manner:

3-mercapto-as-triazino[5,6-b]indole, M.P. higher than 360° C.
3-mercapto-5-ethyl-as-triazino[5,6-b]indole, M.P. 294° C.
3-mercapto-5-propyl-as-triazino[5,6-b]indole, M.P. 278° C.

Use of a starting isatin thiosemicarbazone in which $R^2$ is benzyl or phenethyl gives the N-benzyl or phenethyl-3-mercaptotriazinoindole.

(b) 5 g. of N-methylisatin thiosemicarbazone was suspended in 100 ml. of water containing 4.4 g. of potassium carbonate and the mixture was boiled under reflux for 75 minutes. The orange colored solution was cooled, diluted with 100 ml. of water and acidified with acetic acid. The yellow solid which separated was filtered off, washed with water, dried at 100° C. and recrystallized from a large volume of methanol to give 3-mercapto-5-methyl-as-triazino[5,6-b]indole, M.P. 278°–282° C.

The following compounds were prepared in a similar manner:

3-mercapto-as-triazino[5,6-b]indole, M.P. higher than 360° C.
3-mercapto - 5 - methyl-8-chloro-as-triazino[5,6-b]indole, M.P. 315°–316° C.
3-mercapto-8-nitro-as-triazino[5,6-b]indole, M.P. higher than 350° C.
3-mercapto - 8 - methoxy - as - triazino[5,6-b]indole, M.P. 331° C.
3-mercapto-5-methyl - 8 - bromo-as-triazino[5,6-b]indole, M.P. higher than 350° C.
3-mercapto-5-methyl-8-nitro - as - triazino[5,6 - b]indole, M.P. 283° C.

(c) 16 g. of N-methylisatin, 10 g. of thiosemicarbazide and 21 g. of potassium carbonate were boiled under reflux in 500 ml. of water for 7 hours. A small amount of insoluble material was removed by filtration and discarded and the filtrate was cooled and acidified with acetic acid. The solid which separated was filtered, washed with water and dried at 100° C. to give 3-mercapto-5-methyl-as-triazino[5,6-b]indole, M.P. 275°–281° C.

The following compounds were prepared in a similar manner:

3 - mercapto - 7 - methoxy-as-triazino[5,6 - b]indole, M.P. 309° C.
3-mercapto-5-propyl - 8 - chloro-as-triazino[5,6-b]indole, M.P. 270°–275° C.

EXAMPLE 2

3-(3-dimethylaminopropylamino)-5-methyl-as-triazino[5,6-b]indole

A solution of 10 g. of 3-mercapto-5-methyl-as-triazino-[5,6-b]indole in 40 ml. of 3-dimethylaminopropylamine was refluxed for 6 hours, until the evolution of hydrogen sulphide ceased. The solution was cooled and poured into water to give pale yellow needles. Recrystallization from isopropanol gave 6.5 g. of the product as pale yellow clusters of needles, M.P. 153.5°–154° C.

EXAMPLE 3

3-(2-diethylaminoethylamino)-5-methyl-as-triazino[5,6-b]indole 5 g. of 3-mercapto - 5 - methyl-as-triazino[5,6-b]indole and 10 ml. of diethylaminoethylamine were boiled under reflux. After one hour, the evolution of hydrogen sulphide ceased. The mixture was cooled, diluted with water, the solid removed by filtration and recrystallized from 50% aqueous methanol giving buff colored needles, M.P. 148° C.

The following compounds were prepared in a similar manner:

3-(3 - diethylaminopropylamino) - 5 - methyl-as-triazino-[5,6-b]indole, M.P. 128° C.
3-(3-dipropylaminopropylamino) - 5 - methyl-as-triazino-[5,6-b]indole, M.P. 132° C.

EXAMPLE 4

3-[3-(4-methyl-1-piperazinyl)propylamino]-5-methyl-as-triazino[5,6-b]indole 10 g. of 3-mercapto-5-methyl-as-triazino[5,6-b]indole in 25 g. of N-(3-aminopropyl)-N'-methylpiperazine was heated at 160° to 170° C. for 4 hours, until the hydrogen sulphide evolution ceased. The solution was cooled, poured into 200 ml. of water and the solid which formed was filtered off. Recrystallization from isopropanol gave 5.93 g. of 3 - [3-(4-methyl-1-piperazinyl)propylamino]-5-methyl-as-triazino[5,6-b]indole as cream plates M.P. 174°–175.5° C.

EXAMPLE 5

5-methyl-3-(3-morpholinopropylamino)-as-triazino[5,6-b]indole

A solution of 10 g. of N-(3-aminopropyl)morpholine and 6 g. of 3-mercapto-5-methyl-as-triazino[5,6-b]indole in 25 ml. of ethylene glycol was heated to 160°–170° C. for 5 hours. The cooled mixture was diluted with 250 ml. of water and set aside overnight. The solid was filtered off, washed thoroughly with water and dried. Recrystallization from a mixture of ethanol and dimethylformamide gave 3.15 g. of 5-methyl - 3 - (3 - morpholinopropylamino)-as-triazino[5,6-b]indole as greenish crystals, M.P. 183°–184° C.

EXAMPLE 6 preparation of 3-(3-aminopropylamino)-5-methyl-as-triazino[5,6-b]indole 10 g. of 3-mercapto-5-methyl-as-triazino[5,6-b]indole in 100 ml. of 1,3-propanediamine was refluxed with stirring for 10 hours until the evolution of hydrogen sulphide ceased. The solution was cooled, and 100 ml. of water was added with cooling. The solid which gradually separated was filtered off and dried at 70° C. under vacuum. Recrystallization from benzene gave 8.11 g. of product as yellow plates, M.P. 155°–156° C.

EXAMPLE 7

3-(3-acetamidopropylamino)-5-methyl-as-triazino[5,6-b]indole 12 g. of 3-(3-aminopropylamino)-5-methyl-as-triazino-[5,6-b]indole was added portionwise over 10 minutes to a stirred solution of 4.4 ml. of acetic anhydride (1 mole equiv.) in 110 ml. of pyridine, with water cooling. The suspension was stirred for 4½ hours at room temperature and the solid which separated was filtered off, washed with water, and dried at 70° C. under vacuum. Recrystallization from isopropanol gave 8.71 g. of the product as white needles, M.P. 192°–193° C.

EXAMPLE 8

8-trifluoromethyl-3-(6-aminohexylamino)-5-methyl-as-triazino-[5,6-b]indole

To a stirred 500 cc. three-neck flask were added the following: 9.0 g. (0.054 m.) of chloral hydrate in 60 ml. water, 120 g. of crystalline sodium sulfate, 8.76 g. (0.05 m.) of p-trifluoromethyl-N-methylaniline (prepared by treating p-trifluoromethyl bromobenzene with 5 equivalents of methylamine in a stainless steel bomb at 110° for 8 hours) dissolved in 30 ml. of water containing 4.2 cc. of conc. HCl, and finally a solution of 11.0 g. (0.158 m.) hydroxylamine.HCl in 50 ml. of water. The contents were heated to reflux with a heating mantle and refluxed while stirring for 4 minutes. The aqueous mixture was cooled and extracted with chloroform. After drying and concentration of the organic layer, 5.5 g. (41.5% yield) of an off-white solid product was obtained. It was immediately cyclized to the isatin without further purification.

A mixture of 5.5 g. (0.022 m.) of p-trifluoromethyl-N-methylisonitrosoacetanilide and 25 cc. of conc. $H_2SO_4$ was heated on the steam bath for 10 minutes and poured on crushed ice. The orange solid was collected. It weighed 3.8 g. (75.5% yield). After purification from ethyl acetate-petroleum ether, the orange crystals of 5-trifluoromethyl-N-methylisatin melted at 131°–133° C.

A mixture of 3.8 g. (0.0165 m.) of 5-trifluoromethyl-N-methylisatin in 150 cc. of water containing 1.6 g. thiosemicarbazide and 4.6 g. $G_2CO_3$ was refluxed for 17 hours. The dark amber solution was filtered from any insolubles; cooled and acidified with glacial acetic acid. The percipitated yellow solid was collected and dried. It weighed 4.0 g. giving an 85% crude yield. It was purified from mixture of methanoldimethylformamide giving 3-mercapto-5-methyl-8-trifluoromethyl - as - triazino[5,6-b]indole, M.P. 274°–276° C.

Reaction of this mercapto compound with 1,6-hexanediamine as in Example 6 gives the product.

EXAMPLE 9

3-(8-aminooctylamino)-5-methyl-8-fluoro-as-triazino [5,6-b]indole

A stirred mixture of 5.8 g. (.0324 m.) of 1-methyl-5-fluoroisatin, 3.25 g. (.0358 m.) of thiosemicarbazide, 5.6 g. of anhydrous potassium carbonate, and 650 ml. of water was heated under reflux for 5 hours, cooled, filtered, and the filtrate was acidified with glacial acetic acid. The precipitated yellow solid was filtered off, washed with water, and dried. Yield, 7.6 (quant.); M.P. 300–305° (dec.).

An analytical sample of the 3-mercapto-5-methyl-8-fluorotriazinoindole was recrystallized from aqueous dimethylformamide, M.P. 308–310° (dec.).

Reaction of this mercapto compound with 1,8-octanediamine as in Example 6 gives the product.

EXAMPLE 10

3-(4-piperidinobutylamino)-5-methyl-8-butyl-as-triazino [5,6-b]indole

To a stirred solution of 4.06 g. (.02 m.) of 5-butylisatin in 60 ml. of methanol was added in small portions 20 ml. of 10% methanolic potassium hydroxide followed by 3.0 ml. of dimethyl sulfate in one portion. The temperature rose to 35°. Stirring was continued for 50 minutes, the solid potassium methyl sulfate was removed by filtration, and the solvent was evaporated from the filtrate under reduced pressure. The residual red syrup was treated with 100 ml. of 3 N HCl, heated on a steam bath for 5 minutes, and the cooled mixture was extracted three times with ether totaling 300 ml. The combined extracts were dried over anhydrous magnesium sulfate, and the ether was evaporated to give 3.55 g. (83%) of 1-methyl-5-butylisatin as a red syrup, which was used without further purification.

A stirred mixture of 3.50 g. (.0161 m.) of the above 1-methyl-5-butylisatin, 1.62 g. (.0178 m.) of thiosemicarbazide, 2.8 g. of potassium carbonate, and 370 ml. of water was heated under reflux for 5 hours. The cooled reaction mixture was clarified by filtration through a filter aid, and the filtrate was acidified with glacial acetic acid. The precipitated yellow 3 - mercapto - 5 - methyl-8-butyltriazinoindole was collected by suction filtration and purified by recrystallization from glacial acetic acid. Yield, 2.68 g. (61%); M.P. 242–244° (dec.).

An analytical sample of this 3-mercapto-5-methyl-8-butyl-as-triazino[5,6-b]indole was recrystallized from aqueous dimethylformamide, M.P. 243–245° (dec.).

Reaction of this 3-mercapto compound with 4-piperidinobutylamine as in Example 5 gives the title product.

EXAMPLE 11

3-(3-aminopropylamino)-5,8-dimethyl-as-triazono [5,6-b]indole 1,5-dimethylisatin (2.0 g.), 1.25 g. of thiosemicarbazide and 1.94 g. of potassium carbonate were refluxed in 400 ml. of water for 6 hours. The clear yellow solution was acidified with glacial acetic acid and the yellow 3-mercapto-5,8-dimethyl-as - triazino[5,6 - b]indole collected; M.P. 299–301° C.

Reaction of this 3-mercapto compound with 1,3-propanediamine as in Example 6 gives the title product. Use of N-methyl - 1,3 - propanediamine instead gives 3 - (N-methyl-N-3-aminopropylamino)-5,8 - dimethyl - as - triazino[5,6-b]indole.

EXAMPLE 12

3-(3-amino-2,2-dimethylpropylamino) 8-methoxy-5-methyl-as-triazino[5,6-b]indole 5-methoxy-N-methylisatin (0.5 g.), 0.263 g. of thiosemicarbazide and 0.447 g. of potassium carbonate were suspended in 100 ml. of water and refluxed for 20 hrs. Upon acidifying the clear yellow-orange solution an orange solid precipitated (3-mercapto-5-methyl-8 - methoxy-as-triazino[5,6-b]indole); M.P. 310–312° C.

Treatment of this 3-mercapto compound with 2,2-dimethyl-1,3-propanediamine as in Example 6 gives the title product.

EXAMPLE 13

3-(3-aminopropylamino)-8-butoxy-5-methyl-as-triazino[5,6-b]indole

To a stirring mixture of 16.5 g. (0.1 m.) of p-butoxyaniline in 48 cc. benzene and 36 cc. water containing 3.75 g. NaOH was added dropwise 9.6 g. of acetic anhydride. Temperature was kept between 30°–35° C. with an ice bath. After addition the mixture was stirred at room temperature for 0.5 hr. The precipitated white crystalline solid was collected, washed with cold benzene and dried. The product p-butoxyacetanilide weighed 20.3 g. (98.8% yield). M.P. was 110°–112° C. It was used further without purification.

To a hot solution of 20.7 g. (0.1 m.) of p-butoxyacetanilide in 200 ml. of dry toluene was added portionwise 4.9 gm. of sodium amide over a 20 minute period. Evolution of $NH_3$ was noted. After a 2½ hr. reflux, the heat source was removed and 12.6 g. (0.1 m.) of dimethyl sulfate was added dropwise. Contents were refluxed again for 0.5 hr. and poured into 200 ml. of water. The organic layer was separated and dried over $MgSO_4$. After concentration in vacuo, 20.5 g. (92%) of liquid residue of p-butoxy-N-methylacetanilide was obtained. This was immediately hydrolyzed as described below.

A solution of 20.5 g. (0.092 m.) of p-butoxy-N-methylacetanilide in 81 cc. of ethanol and 9 cc. of water containing 22.5 g. KOH was refluxed for 17 hours. Alcohol was removed in vacuo and the aqueous mixture extracted with benzene. The organic layer was dried and concentrated in vacuo leaving 13.3 g. of brown liquid residue. Distillation at 96°–102° C./0.2 mm. gave 11.3 g. (69% purified yield) of p-butoxy-N-methylaniline.

To a solution of 8.6 g. (0.043 m.) of p-butoxy-N-methylaniline in 32 ml. of dry benzene containing 3.5 g. of dry pyridine was added dropwise 6.12 g. (0.0048 m.) of ethyl oxalyl chloride. The mixture was refluxed for 0.5 hr., the pyridine.CHl salt was removed by filtration and the clear filtrate was concentrated in vacuo to give 14.3 g. of crude yellow residue. The fraction boiling at 145°–150° C./0.5 mm. was collected. It weighed 11.3 g., giving a 94% yield of p-butoxy-N-methyl-N-ethyloxalyl aniline, which was then cyclized to the isatin.

To a solution of 11.3 g. (0.04 m.) of the above in 46 ml. of carbon tetrachloride was added portionwise 8.37 g. (0.04 m.) of phosphorus pentachloride. A slight exotherm was noted. The contents were stirred at room temperature for 45 min., the yellowish solution was concentrated in vacuo and the viscous residue was poured on crushed ice. The red oily product was extracted with chloroform and dried over $MgSO_4$. After concentration, 10 g. of red viscous 5-butoxy-N-methylisatin was obtained.

9 g. (0.038 m.) of 5-butoxy-N-methylisatin and 3.8 g. of thiosemicarbazide in 250 cc. of water containing 11.8 g. $K_2CO_3$ were refluxed for 19 hours. The deep red solution was filtered from insolubles and acidified with glacial acetic acid. The precipitated orange solid was collected and dried. The 3-mercapto-5-methyl-8-butoxy-as-triazino[5,6-b]indole weighed 6.4 g. giving a 59% yield. After recrystallization from methanol-dimethylformamide, it gave an M.P. of 251.5°–253.5° C.

Treatment of this 3-mercapto compound with 1,3-propanediamine as in Example 6 gives the title product.

EXAMPLE 14

3-(3-aminopropylamino)-8-bromo-5-methyl-as-triazino[5,6-b]indole

To a stirred suspension of 2.3 g. (0.01 m.) of 5-bromoisatin in 25 ml. of methanol was added 10 ml. of 10% methanolic KOH followed by 1.5 ml. of dimethyl sulfate. Stirring at room temperature was continued for 45 minutes. The white potassium methyl sulfate salt was removed by filtration and the clear red filtrate was concentrated in vacuo. The solid residue was triturated with aqueous alcohol and filtered to give 1.65 g. (68.8% yield) of 5-bromo-N-methylisatin. After purification from ethanol the deep orange needles melted at 164°–166° C.

A mixture of 0.5 g. (0.002 m.) of 5-bromo-N-methylisatin, 0.2 g. (0.0022 m.) of thiosemicarbazide and 0.6 g. $K_2CO_3$ in 25 ml. of water was refluxed for 4½ hours. Complete solution resulted. The solution was filtered hot from any insolubles, cooled and acidified with glacial acetic acid; 0.55 g. of orange solid was obtained (93% crude yield). It was recrystallized from $CH_3CN$—MeOH mixture to give orange needles of 8-bromo-3-mercapto-5-methyl-as-triazino[5,6-b]indole melting at 289°–291° C.

Treatment of this 3-mercapto compound with 1,3-propanediamine as in Example 6 gives the title product.

EXAMPLE 15

3-(3-aminopropylamino)-8-hydroxy-5-methyl-as-triazino[5,6-b]indole

Refluxing the 8-methoxy compound of Example 12 in 48% HBr for 1–3 hours under a nitrogen atmosphere gives the title product.

8-amino-3-(3 - aminopropylamino) - 5 - methyl-as-triazino[5,6-b]indole is prepared by treating the 8-bromo compound of Example 14 with liquid ammonia in the presence of a small amount of copper and powdered cuprous chloride in a closed pressure vessel at 110° for 7–8 hours.

8-nitro - 3 - (3 - aminopropylamino) - 5 - methyl-as-triazino[5,6-b]indole is prepared by refluxing 3-hydroxy-5-methyl-as-triazino[5,6-b]indole with $POCl_3$ in dimethylaniline for about an hour to give the 3-chloro compound, nitrating the 3-chloro compound with $H_2SO_4$ and $HNO_3$ to give the 8-nitro-3-chloro compound, and then refluxing the 3-chloro compound with 1,3-propanediamine in toluene for about an hour.

The compounds of the present invention exhibit antiviral activity, and are particularly active against rhinoviruses. They have been found to be effective in inhibiting the growth of various strains of rhinoviruses in the standard tube dilution test, described hereinbelow.

Tube culture of diploid human embryonic lung (WI-26) cells were obtained from Baltimore Biological Laboratories in Eagle's Minium Essential Medium with 10% fetal calf serum.

The medium was aspirated off the cultures and replaced with 1 ml. of growth medium [Eagle's Minimum Essential Medium with non-essential amino acids, prepared as described by Eagle, Science 130, 432 (1959)] and 10% fetal calf serum. The medium of paired cultures was supplemented with 500, 100, 20 and 4 $\gamma$/ml. of the compound under test. Four cultures were used as untreated controls. The cultures were incubated at 34° C. in a roller drum (12 r.p.h.). After 3 days the cultures were examined microscopically for evidence of compound toxicity, i.e., alteration in cell morphology observed in unstained cultures at 100× magnification. The maximum compound concentration providing no indication of toxicity in either of the two cultures was the maximum well-tolerated concentration.

The tube cultures described above were then used for the activity determination. Five-tenths ml. of an appropriate dilution of virus in growth median containing 10 $TCID_{50}$ (tissue culture infective dose, i.e., dose causing infection of 50% of the cultures) were added to 40 cultures. Five-tenths ml. of growth median were added to four cultures to be used as cell controls. The cultures were then incubated at 34° C. Excess virus or growth median was removed after 1 hour and 1 ml. of growth medium was added to each culture. Four non-infected cultures used as cell controls and eight infected cultures used as virus controls were maintained in unsupplemented medium. Eight infected cultures were used to determine the antiviral activity of each compound concentration; these received 1, ⅕, 1/25, and 1/125 WTD (well tolerated dose) of test compound diluted with the growth medium. The cultures were rolled at 34° C. The cultures were examined microscopically after four days and scored on the basis of extent of cytopathic effect. The results are stated as a therapeutic ratio, which is the maximum concentration of compound tolerated by the cultures over the minimum concentration which inhibits cell destruction by the virus.

3 - (3 - dimethylaminopropylamino) - 5 - methyl-as-triazino-[5,6-b]indole showed a therapeutic ratio of 20/20 against rhinovirus strain 1059, and 20/4 against strain 33342. 3-(3-acetamidopropylamino)-5-methyl-as-triazino [5,6-b]indole showed a therapeutic ratio of 100/4–20 against strain 1059 and 500–100/500–20 against strain HGP. 3-(3-aminopropylamino)-5-methyl-as-triazino[5,6-b]indole showed a theraptutic ratio of 20/20–4 against strain 1059 and 20/20–4 against strain HGP.

The compounds of the invention may be formulated for use in a manner well known to pharmaceutical chemists by combining them with standard pharmaceutical excipients to form tablets, capsules, ointments and intranasal preparations. The oral formulations may contain between 100 mgs. and 1 g. and may be administered 1–4 times daily.

The preparation of these pharmaceutical compositions is illustrated below:

EXAMPLE 16

Capsules.—300 kg. of 3-(3-aminopropylamino)-5-methyl-as-triazino[5,6-b]indole are finely divided in a comminuting mill to produce a 60 B.S. mesh powder. This powder is filled into No. 1 hard gelatin capsules so that each capsule contains 300 mg. of the active ingredient.

EXAMPLE 17

Tablets.—3.00 kg. of 3-(3-aminopropylamino)-5-methyl-as-triazino[5,6-b]indole, 300 g. of maize starch, 400 g. of lactose and 80 g. of hydrolyzed gelatin are mixed together, then sufficient distilled water is added to produce a damp cohesive mass. The mass is passed through a 16 B.S. mesh screen to produce granules which are dried and then passed through a screen to produce 20 B.S. mesh granules. The dried granules are mixed with 300 g. of maize starch, 800 g. of microcrystalline cellulose, 60 g. of polyethylene glycol 4000 and 60 g. of magnesium stearate. The lubricated granules are compressed on a suitable tabletting machine to produce tablets each weighing 500 mg. and containing 300 mg. of 3-(3-aminopropylamino)-5-methyl-as-triazino[5,6-b]indole.

EXAMPLE 18

Nasal suspension.—100 g. of sodium carboxymethylcellulose of medium viscosity grade are dissolved in 5 liters of distilled water. When solution is complete, 20 g. of sodium citrate, 13 g. of potassium biphthalate, 0.1 g. of thiomersal and 2 ml. of eucalyptol are added. The mixture is stirred until solution takes place. 500 g. of 3 - (3 - aminopropylamino) - 5 - methyl - as - triazino[5, 6-b]indole are slowly dispersed in the gel, and the volume is made up to 10 liters with distilled water.

What we claim is:

1. A compound of the formula:

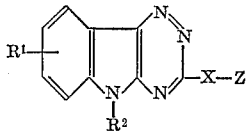

wherein:

$R^1$ is hydrogen, halogen, alkyl of 1–4 carbon atoms, hydroxy, alkoxy of 1–4 carbon atoms, nitro, amino, or trifluoromethyl;

$R^2$ is hydrogen, alkyl of 1–4 carbon atoms, benzeyl, or phenethyl;

X is $NR^3$, where $R^3$ is hydrogen or methyl;

Z is $AlkNR^4R^5$;

Alk is straight or branched chain alkylene of 2–10 carbon atoms; and $R^4$ and $R^5$ are each hydrogen or alkyl of 1–4 carbon atoms, or together with the adjacent nitrogen atom, morpholino, piperidino, pyrrolidino, or 4-methyl-1-piperazinyl, or a pharmaceutically acceptable acid addition salt thereof.

2. A compound as claimed in claim 1, wherein $R^2$ is methyl, $R^3$ is hydrogen, and $R^1$ is at the 8-position.

3. A compound as claimed in claim 2, wherein $R^1$ is hydrogen and $R^4$ and $R^5$ are hydrogen or alkyl of 1–4 carbon atoms.

4. A compound as claimed in claim 3, which is 3-(3-aminopropylamino)-5-methyl-as-triazino[5,6-b]indole.

5. A compound as claimed in claim 3, which is 3-(3-dimethylaminopropylamino) - 5 - methyl - as - triazino[5,6-b]indole.

6. A compound as claimed in claim 1, which is 3-(4-piperidinobutylamino) - 5 - methyl - 8 - butyl - as - triazino[5,6-b]indole.

7. A compound as claimed in claim 1, which is 3-(3-amino - 2,2 - dimethylpropylamino) - 8 - methoxy - 5-methyl-as-triazino[5,6-b]indole.

8. 3 - (3 - acetamidopropylamino) - 5 - methyl - as-triazino[5,6-b]indole.

References Cited

FOREIGN PATENTS 6410823    3/1965    Netherlands.

OTHER REFERENCES

King et al., J. Chem. Soc., pp. 2314–8 (1948). QD 1. C6.

HENRY R. JILES, Primary Examiner

J. M. FORD, Assistant Examiner

U.S. Cl. X.R.

260—247.5, 249.5, 325; 424—249